(12) United States Patent
Dinur et al.

(10) Patent No.: US 7,440,526 B2
(45) Date of Patent: Oct. 21, 2008

(54) METHOD AND APPARATUS TO ACQUIRE FRAME WITHIN TRANSMISSION

(75) Inventors: Nati Dinur, Omer (IL); Dror Arad, Kiryat Ata (IL)

(73) Assignee: Intel Corporation, Santa Clara, CA (US)

(*) Notice: Subject to any disclaimer, the term of this patent is extended or adjusted under 35 U.S.C. 154(b) by 939 days.

(21) Appl. No.: 10/401,961

(22) Filed: Mar. 31, 2003

(65) Prior Publication Data

US 2004/0192242 A1 Sep. 30, 2004

(51) Int. Cl.
*H04B 7/10* (2006.01)

(52) U.S. Cl. ........................... 375/347; 375/340

(58) Field of Classification Search ............... 375/140, 375/141, 142, 143, 147, 148, 150, 152, 267, 375/340, 343, 345; 370/334; 343/725, 729; 455/560, 561
See application file for complete search history.

(56) References Cited

U.S. PATENT DOCUMENTS 5,375,140 A * 12/1994 Bustamante et al. ........ 375/142
7,106,709 B2 * 9/2006 Davidsson et al. .......... 370/330

* cited by examiner

*Primary Examiner*—Chieh M. Fan
*Assistant Examiner*—Jaison Joseph
(74) *Attorney, Agent, or Firm*—Pearl Cohen Zedek Latzer, LLP

(57) ABSTRACT

Briefly, a method and apparatus to detect and acquire a frame within a transmission are provided. The apparatus may be coupled to at least two antennas and may include a frame acquisition module to detect and acquire the frame received within a transmission by one of the antennas.

20 Claims, 2 Drawing Sheets

METHOD AND APPARATUS TO ACQUIRE FRAME WITHIN TRANSMISSION

BACKGROUND OF THE INVENTION

A receiver and, more particularly, a receiver that may be used with a wireless local area network (WLAN) may utilize a predetermined time to detect a transmission. A transmission may include a preamble signal of 16 microsecond (uSec). The first half of the preamble signal may include 10 repetitions of a short training sequence of 0.8 uSec. The second half of the preamble signal may be used for acquiring a frequency of the transmission and may be used to estimate channel parameters. For example, the predetermined time may be the time of the preamble signal, which is the time required by some WLAN standards to acquire the frequency of the transmission.

Disadvantageously, the detection of the transmission and the acquisition of the frequency in a such short time interval may cause miss detection and/or false alarm.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
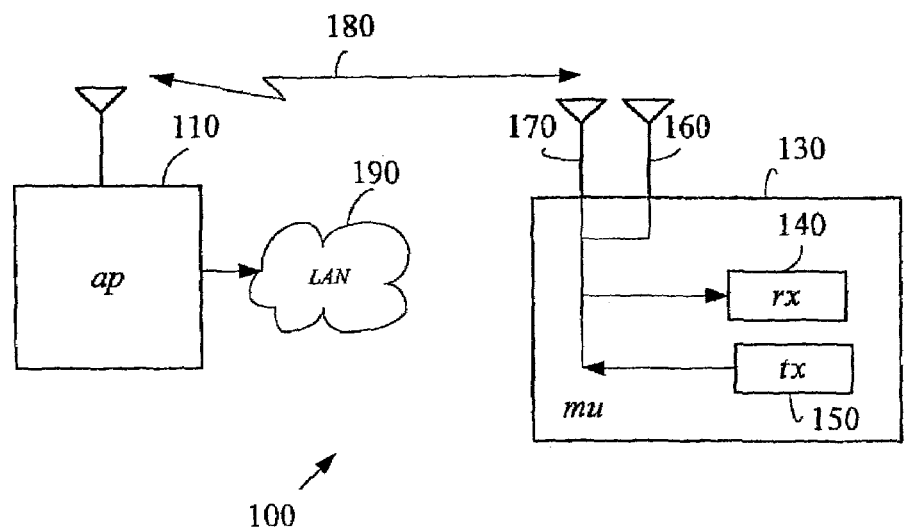
FIG. 1 is a schematic illustration of a wireless communication system that may include a receiver according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

It should be understood that the present invention may be used in a variety of applications. Although the present invention is not limited in this respect, the circuits and techniques disclosed herein may be used in many apparatuses such as receivers of a radio system. Receivers intended to be included within the scope of the present invention include, by way of example only, wireless local area network (WLAN) receivers, two-way radio receivers, digital system receivers, analog system receivers, cellular radiotelephone receivers and the like.

Types of WLAN receivers intended to be within the scope of the present invention include, although are not limited to, receivers for receiving spread spectrum signals such as, for example, Frequency Hopping Spread Spectrum (FHSS), Direct Sequence Spread Spectrum (DSSS), Orthogonal frequency-division multiplexing (OFDM) and the like.

Turning to FIG. 1, a wireless communication system 100, for example, a WLAN communication system, is shown. Although the scope of the present invention is not limited in this respect, the exemplary WLAN communication system 100 may include at least one access point (AP) 110 and at least one mobile unit (MU) 130. Mobile unit 130 may include a receiver 140, a transmitter 150, and at least two antennas, antennas 160 and 170. In some embodiments of the present invention, MU 130 may include an antenna array and antennas 160 and 170 may comprise antenna arrays.

In operation, according to an embodiment of the invention, a wireless communication link 180 may be used to transport transmissions between AP 110 and MU 130. MU 130 may establish connection to the Internet and/or to a local area network (LAN) 190 via AP 110.

In embodiments of the present invention, the communications may be modulated and transmitted with an OFDM signal. The OFDM signal may be split into several channels at different frequencies. For example, in some WLAN communication systems, wireless communication link 180 may include 52 sub-channels at different frequencies, if desired.

Figure 2:
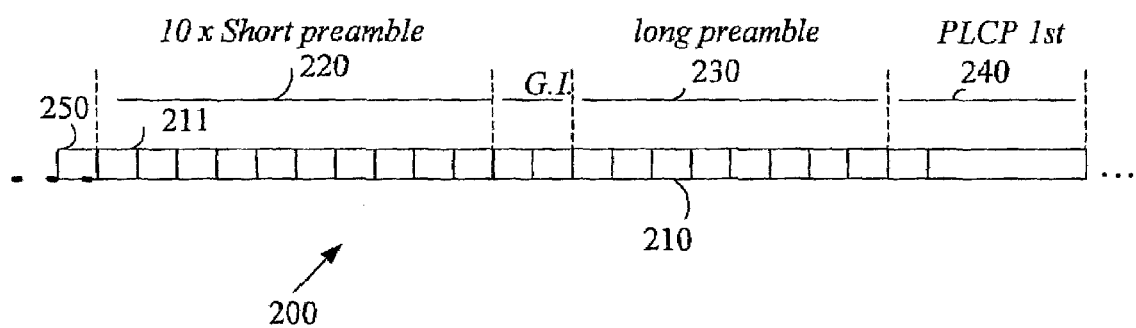
FIG. 2 is a schematic illustration of a frame that may be helpful in understanding some embodiments of the present invention.

Turning to FIG. 2, a portion of an exemplary transmission 200 is shown. Transmission 200 may include a portion of a frame 210 that may be detected and/or acquired by receiver 140. Although the scope of the present invention is not limited in this respect, the portion of frame 210 may include a short preamble 220, a long preamble 230 and a first physical layer convergence procedure (PLCP) time interval 240. Furthermore, a predetermined silence period 250 may be positioned at the beginning of frame 200. For example, in some embodiments of the present invention the silence period 250 may be 16 microsecond. The short preamble 220 may include 10 repetitions of training sequence 211. For example, training sequence 211 may be 0.8 microsecond long, although the scope of the present invention is not limited in this respect.

Figure 3:
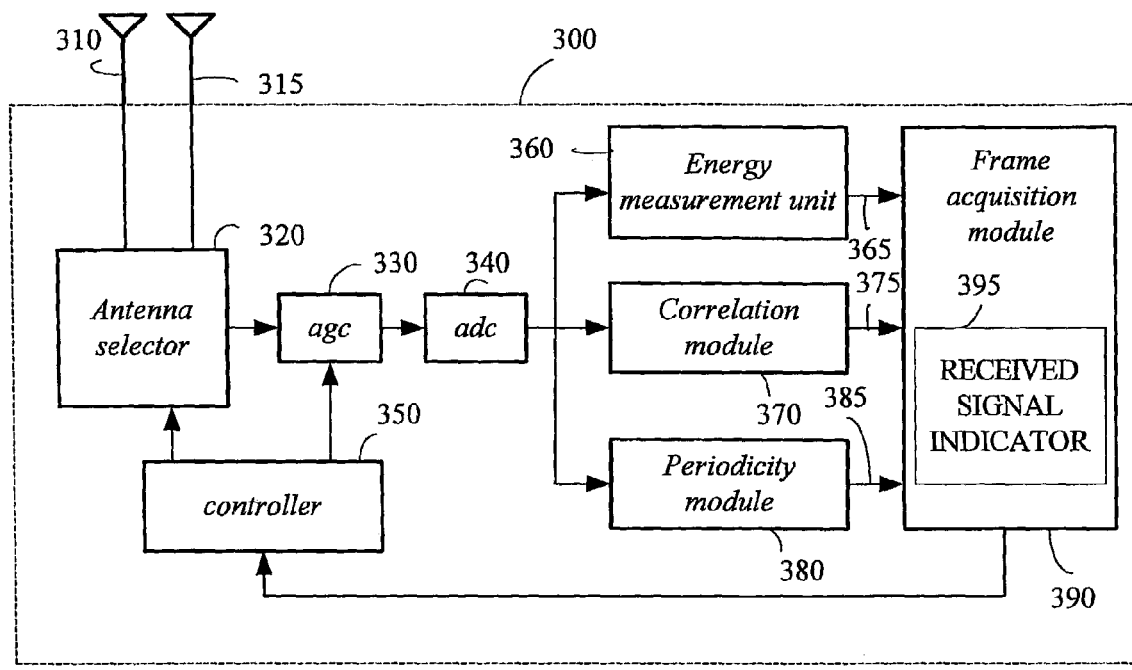
FIG. 3 is a block diagram of a receiver according to an exemplary embodiment of the present invention.

Turning to FIG. 3, a block diagram of a receiver 300 according to an exemplary embodiment of the present invention is shown. Although the scope of the present invention is not limited in this respect, receiver 300 may include an antenna 310, an antenna 315, an antenna selector 320, an automatic gain controller (AGC) 330, an analog to digital converter (ADC) 340, a controller 350, an energy measurement unit 360, a correlation module 370, a periodicity module 380 and a frame acquisition module 390. In some embodiments of the present invention, energy measurement unit 360, correlation module 370, periodicity module 380 and frame acquisition module 390 may be implemented in software or in hardware or as a combination of software and hardware, if desired.

In operation, although the scope of the present invention is not limited in this respect, controller 350 may command antenna selector 320 to switch periodically between antennas 310 and 315 within a predetermined interval of 0.8 microseconds, if desired. Accordingly, during a first interval antenna 310 may receive at least one transmission and during a second interval antenna 315 may receive at least one other transmission. The transmission, for example transmission 200 may be received by antenna 310 and/or antenna 315 and may include, for example, frame 210. Although the scope of the present invention is not limited in this respect, antenna 310 and/or antenna 315 may include antenna arrays, if desired. Furthermore, in some embodiments of the present invention three or more antennas may be used.

Although the scope of the present invention is not limited in this respect, AGC 330 may adjust the amplitude level of the received transmission. In some embodiments of the present invention, transmission 200 may be an analog signal and ADC 340 may convert the analog signal into a digital signal. In an embodiment of the invention, energy measurement unit 360 may measure and/or estimate an energy of transmission 200 to provide an energy value to frame acquisition module 390.

Although the scope of the present invention is not limited in this respect, energy measurement unit 360 may measure and/or estimate an energy value of the transmission received by antenna 310 and may measure and/or estimate an energy value of the transmission received by antenna 315. Furthermore, energy measurement unit 360 may measure and/or estimate a predetermined silence period, e.g. silence period 250, on one of antennas 310, 315 to enable the detection of transmission 200 and the acquisition of frame 210 by frame acquisition module 390, if desired.

Although the scope of the present invention is not limited in this respect, correlation module 370 may provide a score to frame acquisition module 390 based on a correlation between a received sequence of frame 210 with a training sequence (not shown). For example, the score may be the peak value of the correlation and/or sum of at least some of the samples in the proximity of the peak level of the correlation. Additionally or alternatively, correlation module 370 may estimate and/or measure the correlation of transmission 200 and may provide a correlation value 375 to frame acquisition module 390.

Although the scope of the present invention is not limited in this respect, periodicity module 380 may provide a periodicity score 385 to frame acquisition module 390 based on the periodicity of preamble sequence 211 of frame 210. For example, the calculation of periodicity score 385 may be based on the periodicity of preamble sequence 211, for example a 0.8 microsecond period. More specifically, the periodicity score may be calculated using the following function $|\int input\_signal(t) \cdot input\_signal^*(t-0.8 \ \mu S)|$ wherein, input_signal may be a signal that carries the transmission received by at least one of antennas 310 and 315, although the scope of the present invention is not limited in this respect. Periodicity module 380 may provide periodicity score 385 to frame acquisition module 390.

Although the scope of the present invention is not limited in this respect, energy value 365, correlation value 375 and/or the periodicity score 385 that may be generated based on the transmission that received by antennas 310, 315 may be used to generate a receive signal indicator 395. For example, energy value 365, correlation value 375 and/or the periodicity score 385 that may be generated based on the transmission received by antennas 310 may be used to generate a first value of receive signal indicator 395. In addition, energy value 365, correlation value 375 and/or the periodicity score 385 that may be generated based on the transmission received by antennas 315 may be used to generate a second value of receive signal indicator 395.

In some alternative embodiments of the present invention, frame acquisition module 390 may generate first and second values of receive signal indicator 395 for antennas 310 and 315 respectively and provide the first and second values of received signal indicator 395 to controller 350. Controller 350 may be, for example, a processor capable of performing control functions and may control antenna selector 320 to select an antenna based on the values of received signal indicator value 395. For example, if the value of received signal indicator 395 generated for antenna 310 is higher than the value of received signal indicator 395 generated for antenna 315, then antenna selector 320 may select antenna 310, and vice versa. Furthermore, controller 350 may instruct AGC 330 to set its gain based on the selected value of received signal indicator 395, if desired.

Although the scope of the present invention is not limited in this respect, in some embodiments of the present invention the antenna selection may be done based on a rule and/or criterion. For example, the rule and/or criterion may be 'start of transmission detected if correlation_measure>b+energy*a or if energy>c'. In addition, the rule and/or criterion may include a predetermined threshold. The predetermined threshold may include a first threshold level to indicate a high energy of the transmission and a second threshold to indicate a low energy of the transmission, although the scope of the present invention is not limited in this respect.

Additionally or alternatively, frame acquisition module 390 may instruct controller 350 to adjust AGC 330 based on the energy value and the operation mode of receiver 300. For example, a first mode may be selection between antennas 310 and 315 and a second mode may be receiving transmissions with a single antenna. Thus, in the first mode frame acquisition module 390 may instruct controller 350 to adjust AGC 330 with a two-stage adjustment algorithm, and in the second mode, frame acquisition module 390 may instruct controller 350 to adjust AGC 330 with a three-stage adjustment algorithm, although the scope of the present invention is not limited in this respect.

In embodiments of the present invention controller 350 may use the following exemplary two-stage algorithm to adjust AGC 330:

If the energy value is under a predetermined value;

Stage one may be: Set AGC 330 level based on past energy measurements;

Provide a coarse frequency estimation, a timing estimation, a signal to noise ratio (SNR) estimation, a channel quality estimation, and AGC estimation for transmission received by a first antenna e.g. antenna 310;

Stage two may be: Repeat previous stage estimations for all other antennas e.g. antenna 315; and select antenna based on a score of the channel quality estimation, and set the AGC 330 accordingly.

In some embodiments of the present invention, the first stage may be done in 2 microsecond and the algorithm may be performed at no more then 8 microsecond.

Additionally or alternatively, although the scope of the present invention is not limited in this respect, controller 350 may use the following exemplary three-stage algorithm to adjust AGC 330:

- Stay with the antenna in which the high energy value was measured;
- Lower the AGC gain;
- Estimate the AGC level needed to adjust the AGC, and set the AGC accordingly;
- Provide a coarse frequency estimation, a timing estimation, an SNR estimation, a channel quality estimation, and an AGC estimation; and
- Set the AGC accordingly.

Although the scope of the present invention is not limited in this respect, an exemplary timing estimation will now be described. The timing estimation may be channel dependant. Timing estimation may be done by use of cyclic correlation with a short training sequence 211 to estimate the impulse response of the channel. Based on the impulse response of the channel, the timing may be determined such that inter-symbol interference is minimal. In addition, the timing estimation may output the start of the 3.2 microsecond interval (not shown) that may be fed into a fast Foriur transform module (FFT).

Although the scope of the present invention is not limited in this respect, an exemplary method of coarse frequency estimation will now be described. Transmission 200 may be sampled and a stream of 64 consecutive samples may be used for the estimation. The coarse frequency estimation may be done by calculating the frequency error according to below equation:

$$\text{freq\_err} \approx \text{phase}\left[\sum_{1}^{32} (sig(n) - DC) \cdot (sig(n+32) - DC)^*\right] \text{ where}$$

$$DC = \frac{1}{32}\sum_{1}^{32} sig(n).$$

wherein;
DC is the direct current (DC) level; and
phase is the phase of the transmission.

The result of the calculation e.g. freq_err may be added and or deleted from the previous frequency.

Although the scope of the present invention is not limited in this respect, an exemplary method of the AGC estimation may be done by transferring the estimated energy level to dB relative to a desired value. The result may be added to the current AGC state.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
    an antenna selector to select a transmission received from at least one antenna of a first antenna and a second antenna based on a first and a second value of a received signal indicator measured from the transmission;
    a frame aquisition module to acquire a frame received within the transmission received by an antenna selected from the first and second antennas;
    a periodicity module to provide a periodicity score to the frame aquisition module based on the periodicity of a preamble sequence of the frame; and
    a correlation estimator module to provide a correlation score to the frame aquisition module based on a correlation between a received sequence of the frame and a training sequence;
    wherein the frame aquisition module to generate the first and second values of received signal indicator based on correlation score and periodicity score.

2. The apparatus of claim 1 further comprising:
    a controller to set a gain of an automatic gain control based on an estimated energy value of the transmission received by the antenna selected from the first and second antennas.

3. The apparatus of claim 1, further comprising:
    an energy measurement module operably coupled to the frame aquisition module to measure a first energy value of the transmission received by the antenna selected from the first and second antennas.

4. The apparatus of claim 3, wherein the energy measurement module measures a predetermined silence period on the first and second antenna to enable the detection of the transmission and the aquisition of the frame.

5. The apparatus of claim 1, wherein the correlation score comprises a peak value of the correlation.

6. The apparatus of claim 5, wherein the correlation score comprises a sum of at least some samples in proximity to the peak value of the correlation.

7. The apparatus of claim 2, wherein the controller is able to compare the estimated energy value to a high energy threshold level and a low energy threshold level.

8. The apparatus of claim 2, wherein the controller is able to set the automatic gain control level based on the estimated energy level of the transmission.

9. A method comprising:
    selecting a transmission received from at least one antenna of a first antenna and a second antenna based on a first and a second value of a received signal indicator measured from the transmission;
    acquiring a frame received within the transmission received by an antenna selected from the first and second antennas; and
    calculating a periodicity score and providing the periodicity score to a frame aquisition module based on the periodicity of a preamble sequence of the frame;
    detecting the frame within said transmission by determining if at least one of an energy value, a correlation value and the periodicity score measured from the transmission is within a predetermined criterion;
    detecting a predetermined silence period by measuring said energy value of the transmission received by at least one of a first antenna and a second antenna;
    estimating an impulse response value of a channel by using cyclic correlation with a short training sequence;
    measuring a minimal value of an inter-symbol interference value of said channel; and
    determining a timing value based on the impulse response value and the minimal value of the inter-symbol interference value.

10. The method of claim 9 comprising:
    selecting from the at least one of the first and second antennas an antenna for receiving the transmission based on a channel quality indicator; and
    setting a gain of automatic gain control based on said channel quality indicator measured at the selected antenna.

11. The method of claim 10 wherein setting the gain of automatic gain control comprises:
   reducing the gain of the automatic gain control to a predetermined level;
   estimating a desired gain of the of automatic gain control level; and
   setting the gain of the automatic gain control to the desired gain.

12. The method of claim 11, wherein estimating the gain of the automatic gain control comprises estimating coarse frequency of the received signal at the selected antenna.

13. The method of claim 9, further comprising estimating a signal to noise ratio value of the transmission.

14. The method of claim 9, further comprising estimating the channel quality indicator.

15. An apparatus comprising:
   a first dipole antenna and a second dipole antenna;
   an antenna selector to select at least one dipole antenna of the first and second dipole antennas based on a first and a second value of a received signal indicator measured from a transmission received by the first and second dipole antenna respectively;
   a frame aquisition module to acquire a frame received within a transmission received by a dipole antenna selected from the first and second dipole antennas;
   a periodicity module to provide a periodicity score of to the frame aquisition module based on the periodicity of a preamble sequence of the frame; and
   a correlation estimator module to provide a correlation value to the frame aquisition module based on a correlation between a received sequence of the frame with a training sequence;
   wherein the frame aquisition module to generate the first and second values of received signal indicator based on correlation value and periodicity score.

16. The apparatus of claim 15, further comprising:
   a controller to set a gain of an automatic gain control based on an estimated energy value of the transmission received by the dipole antenna selected from the first and second dipole antennas.

17. The apparatus of claim 15, further comprising:
   an energy measurement module operably coupled to the frame aquisition module to measure a first energy value of the transmission received by the dipole antenna selected from the first and second dipole antennas.

18. A system comprising:
   an access point to communicate with a mobile unit over a wireless link wherein, the mobile unit comprises an antenna selector to select a transmission received from at least one antenna of a first antenna and a second antenna based on a first and a second value of a received signal indicator measured from the transmission;
   a frame aquisition module to acquire a frame received within the transmission received by an antenna selected from the first and second antennas;
   a periodicity module to provide a periodicity score of to a frame aquisition module based on the periodicity of a preamble sequence of the frame; and
   wherein the mobile unit comprises a correlation estimator module to provide a correlation value to the frame aquisition module based on a correlation between a received sequence of the frame and a training sequence;
   wherein frame aquisition module to generate the first and second values of received signal indicator based on correlation value and periodicity score.

19. The system of claim 18, wherein the mobile unit comprises:
   a controller to set a gain of an automatic gain control based on an estimated energy value of the transmission received by the antenna selected from the first and second antennas.

20. The system of claim 18, wherein the mobile unit comprises:
   an energy measurement module operably coupled to the frame aquisition module to measure a first energy value of the transmission received by the antenna selected from the first and second antennas.

* * * * *